July 10, 1934.   W. ALLEN   1,965,819
INSPECTION MACHINE
Filed Oct. 10, 1931   3 Sheets-Sheet 3
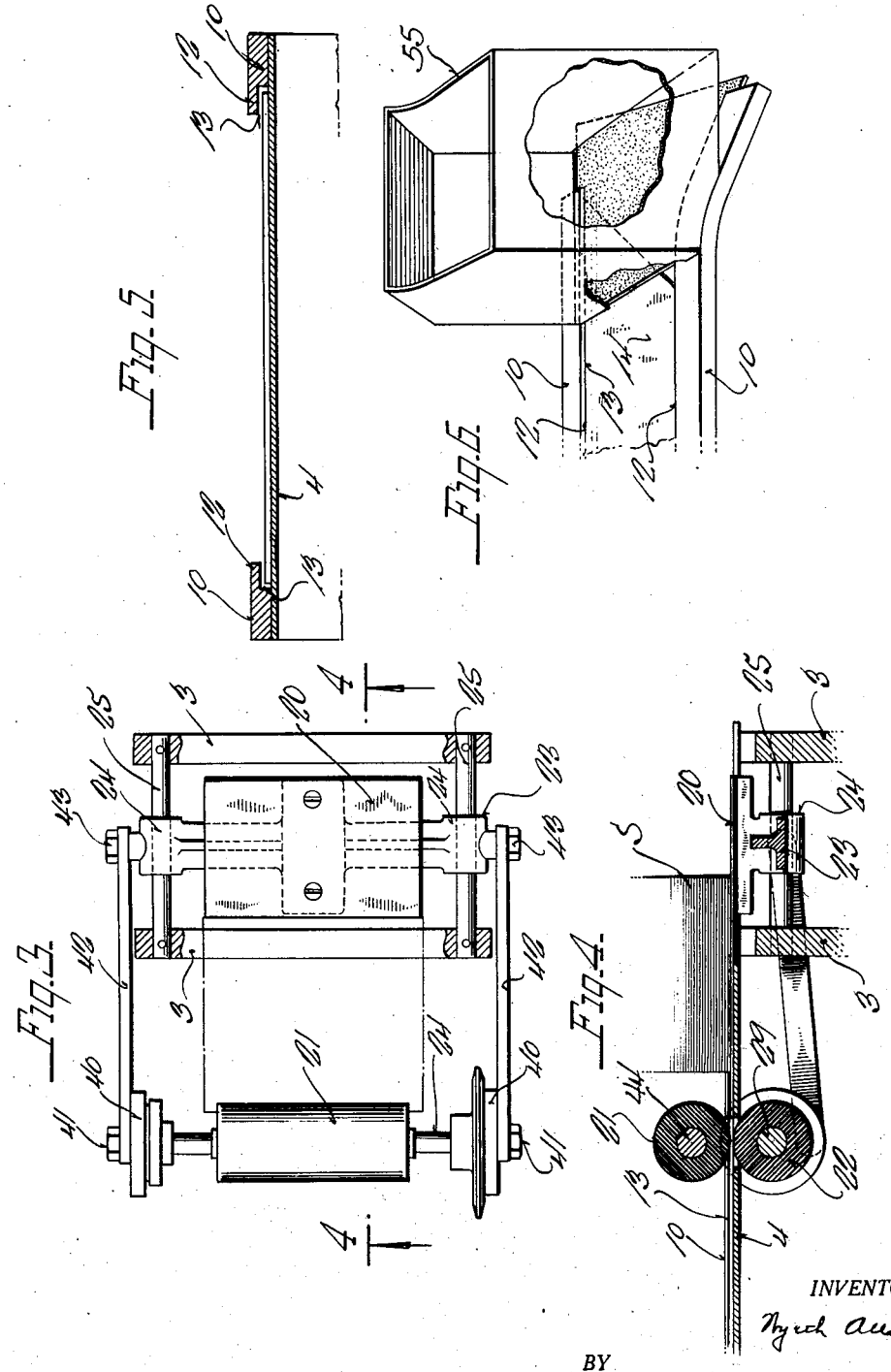

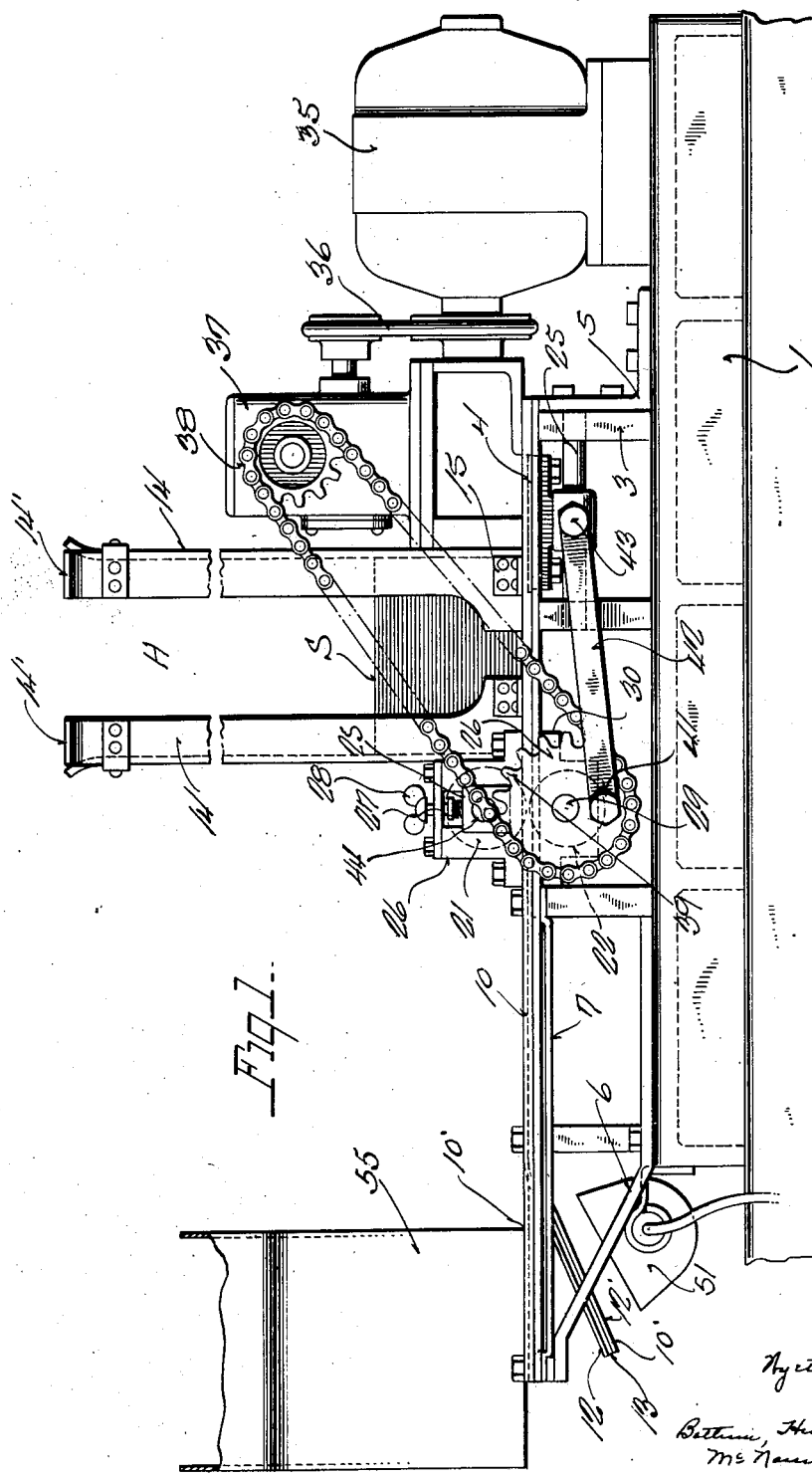

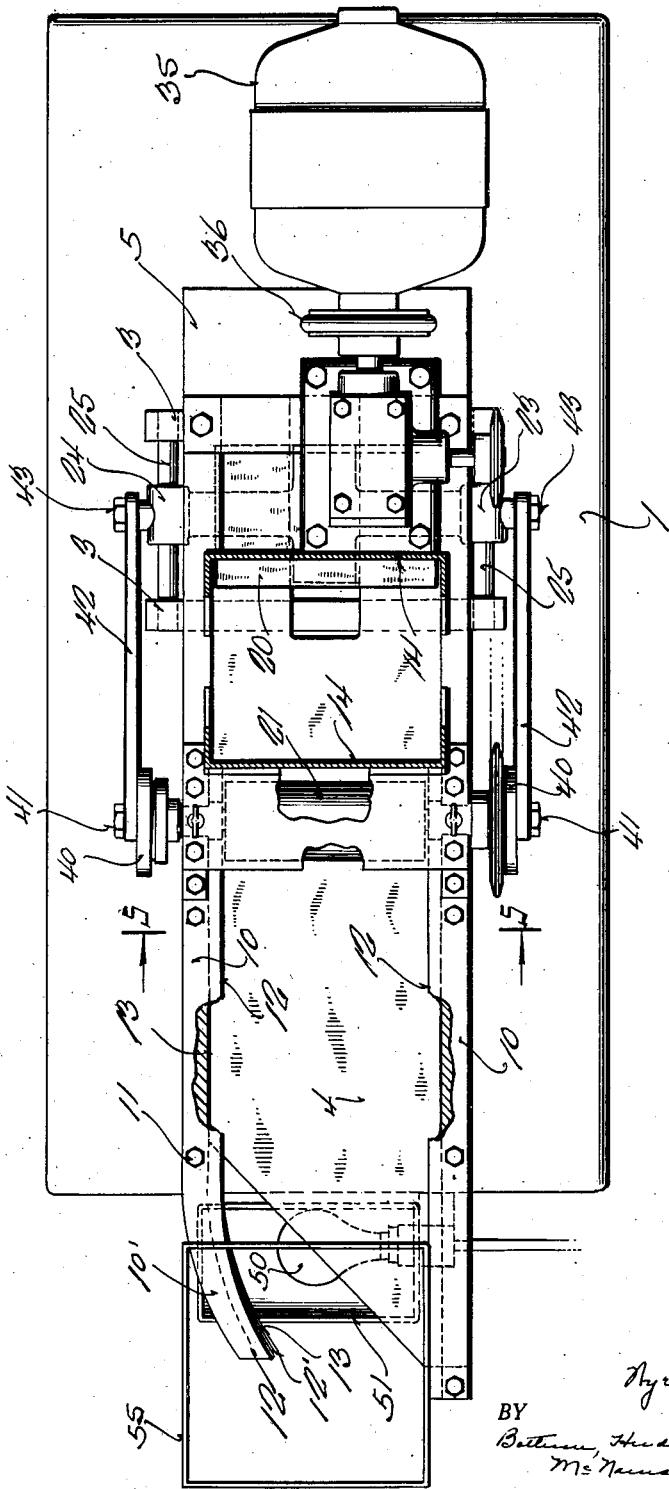

Patented July 10, 1934

1,965,819

UNITED STATES PATENT OFFICE 1,965,819

INSPECTION MACHINE

Wyeth Allen, Milwaukee, Wis., assignor to Globe-Union Mfg. Co., Milwaukee, Wis., a corporation of Wisconsin Application October 10, 1931, Serial No. 568,028

8 Claims. (Cl. 88—14)

This invention relates in general to an inspection machine and is particularly designed and adapted for inspecting battery separators for cracks, knots, sap streaks, etc. although also adapted for other uses and applications.

One of the principal objects of the present invention is to provide a machine of this character which has the capacity for handling a relatively large number of separators and which has the advantage of speeding up the inspection operation while insuring detection of imperfections which render the separators unfit for use in the battery.

In the embodiment of the present invention designed and adapted for use in inspecting separators for batteries, a hopper is provided which contains a stack of separators. Extending from the bottom of the hopper is a guide for the plates. The guide has a portion curved or so inclined and designed as to give a twist to each separator as it is fed through such portion. Adjacent the portion of the guide which gives the twist to the separators is a source of light which is so arranged and related to the guide as to throw the rays of light through the separator as the same is twisted. Intermittent feeding mechanism is organized with the hopper and with the guide and operates to feed the separators one by one along the guide and past the source of light. The intermittent feeding mechanism is of such character and so operates that each separator comes to a momentary stop when traversed by the rays of light from the light source, thus affording ample opportunity for effective and reliable inspection. The light source is so related to the guide and the separators are fed through the guide in such a manner that the light does not, during any phase of the operation, glare into the eyes of the inspector.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view in side elevation showing an inspection machine embodying the present invention;

Figure 2 is a view in top plan of the machine shown in Figure 1, with parts shown in horizontal section and parts broken away for the sake of illustration;

Figure 3 is a fragmentary detail view, partly in top plan and partly in horizontal section illustrating certain of the elements of the intermittent feeding mechanism;

Figure 4 is a view in vertical section taken on line 4—4 of Figure 3;

Figure 5 is a fragmentary detail sectional view taken on line 5—5 of Figure 2; and Figure 6 is a fragmentary perspective view illustrating the portion of the guide which twists the separator and also showing the hood through which the inspector views the plates, parts being broken away for the sake of illustration.

Referring to the drawings, it will be seen that, in the construction illustrated, a suitable base or foundation 1 is provided. Brackets 3 are secured to the foundation 1 and at their upper ends are secured to and support a supporting plate 4. The support for the plate 4 may be augmented by an angle iron 5, a supporting strap 6 and a brace 7. It is to be appreciated, however, that these and other details of the design may be widely varied.

A hopper designated generally at H is provided and is adapted to receive a stack of separators designated at S. The hopper may comprise a pair of confronting channels 14 having their lower ends appropriately secured as at 15 to the guide strips and extending vertically and upwardly from these strips. The channels 14 confront each other to define a box-like hopper. At their upper ends these channels 14 may have their body portions and side flanges flaring outwardly as at 14', to facilitate introduction of the separators S into the hopper.

Extending longitudinally and along the sides of the supporting plate 4 are guide strips 10, the guide strips 10 being securely fastened in position by means of suitable fastening devices such as bolts or screws 11. The guide strips 10 are provided with flanges 12 which coact with the supporting plate 4 to provide guide grooves 13 as illustrated in Figure 5. Below the hopper the flanges 12 of the guide strips are cut away to permit the separators to move from the hopper down onto the supporting plate 4.

Intermittent feeding mechanism is provided and may comprise a reciprocable feed plate 20 and a pair of feed rolls designated at 21 and 22. The feed plate 20 is suitably secured to a slide or carrier 23 having bearings 24 slidably fitted on supporting rods 25 secured to certain of the brackets 3 as will be clear from Figure 3. The upper feed roll has its shaft 44 supported in bearing blocks 45 slidably mounted in bearing brackets 26 and urged downwardly by means of springs 27 engaging the upper ends of the blocks at their lower ends and tensioning screws 28 at their upper ends. This structure causes the upper feed roll to be yieldably urged toward the lower feed roll 22 which is fixed to a shaft 29 mounted for rotation in suitable bearings 30 provided therefor.

The shaft 29 is driven from an electric motor 35 by means of belt and pulley gearing 36, a conventional speed reducer designated generally at 37, and chain and sprocket gearing designated at 38. The driven sprocket 39 of the chain and sprocket gearing is fixed to the shaft 29 whereby the shaft 29 is rotated from the electric motor 35 and, as a consequence, the lower feed roll is positively driven.

For the purpose of reciprocating plate 20, the shaft 29 has two crank discs 40 fixed thereto and provided with crank pins 41 interconnected with connecting rods or links 42 which are also pivotally connected as at 43 with the slide or sliding carrier 23. In this way the plate 20 is co-ordinately actuated with the feed rolls 21 and 22 or, in other words, the action of the plate is synchronized with the action of the feed rolls.

With the motor running, the plate 20 reciprocates back and forth and when it moves to the left as viewed in Figures 1 and 4 it pushes the bottom-most separator from the stack and forces it along the guides and in between the feed rolls. The feed rolls continue to advance the separator along the guides. By the time the separator so acted on has been appropriately advanced the plate 20 is again engaged in advancing another separator toward the feed roll. This action is repeated over and over again with the result that separators are engaged with each other and in end to end relation during their passage through the guides and the feed imparted thereto by the feed rolls is transmitted to all of the separators lying in the guides and beyond the feed rolls.

The supporting plate 4 terminates short of the ends of the guides 10 in an angled or inclined edge 4' shown to advantage in Figure 2. The portion of one of the guides 10 which projects beyond the edge 4' of the plate 4 is curved inwardly and downwardly as shown at 10' and as will be clear from a comparison of Figures 1 and 2. The curved projecting end portion 10' is provided with a lower flange 12' as well as with the upper flanges 12 to complete the formation of the guide grooves 13 which coact with the edges of the separators to control their motion or constrain them to the desired movement under the influence of the feeding mechanism. As a result of this curving of one of the guide members and by reason of the absence of a lower flange 12' of the other guide member beyond plate 4, the separators when passing out through the end portions of the guides 10 are given a twist which has the advantage of revealing cracks or other imperfections or defects.

A source of light which may be a lamp designated at 50 is provided below the discharge end of the guides and is equipped with a suitable reflector 51. The reflector and light source are so disposed and the separators are so fed through the guides that the direct rays of the light source are never thrown on the eyes of the operator whereby an undesirable glare in the eyes of the operator or the inspector is avoided.

To further facilitate inspection, a suitable hood in the form of an open ended box-like and opaque casing designated at 55 is provided at the discharge end of the guides and just above that portion of the guides which give the separators a twist and whereat the separators are subjected to the rays of light from the light source.

It will be noted that the crank motion which actuates the reciprocable feed or ejector plate provides for a slight stop in the movements of the separators along the guides so that the separators pause or stop for a short space of time when immediately over the light source. This has the advantage of further insuring reliable inspection.

The invention claimed is:

1. An inspection machine of the character described comprising a guide cooperable with the edges of the articles to be inspected and having means for twisting the articles as they are passed through the guide, a source of light disposed to throw light rays through the articles as they are twisted from the side opposite to that which the articles are viewed as they are inspected to reveal any defects or imperfections therein, and means for feeding the articles along said guide.

2. An inspection machine of the character described comprising a guide cooperable with the edges of the articles to be inspected and having means for twisting the articles as they are passed through the guide, a source of light disposed to throw light rays through the articles as they are twisted from the side opposite to that which the articles are viewed as they are inspected to reveal any defects or imperfections therein, and intermittent feeding mechanism for feeding the articles along the guide with a step by step motion.

3. A machine for inspecting battery separators and other pliable plate-like articles, comprising a hopper for containing a stack of the articles to be inspected, a guide leading from the hopper and having an inspection opening beyond the hopper, means for feeding the articles from the hopper along the guide and past the opening, a light source adjacent the opening and disposed to project light rays on the articles as they pass the opening on the sides opposite to that viewed at the opening, and means for giving a torsional twist to the articles as they pass the opening to render the articles more pervious to the passage of the light rays at any defects or imperfections in the articles to reveal the same.

4. A machine for inspecting battery separators and other pliable plate-like articles, comprising a hopper for containing a stack of the articles to be inspected, a guide leading from the hopper and having an inspection opening beyond the hopper, means for feeding the articles from the hopper along the guide and past the opening, and a light source adjacent the opening and disposed to project light rays on the articles as they pass the opening on the sides opposite to that viewed at the opening, said guide having a portion constructed and arranged to give a torsional twist to the articles as they pass the opening to render the articles more pervious to the passage of the light rays at any defects or imperfections in the articles to reveal the same.

5. A machine for inspecting battery separators and other pliable plate-like articles, comprising means providing an inspection opening, a light source adjacent the opening and disposed to project light rays on the articles on the sides opposite to that viewed at the opening, means for feeding the articles past the opening, and means for giving the articles a torsional twist as they pass the opening to render the articles more pervious to the passage of the light rays at any defects or imperfections in the articles to reveal the same.

6. A machine for inspecting battery separators and other pliable plate-like articles, comprising a guide for the articles to be inspected and having side channels and an inspection opening therebetween, and a light source adjacent the opening and disposed to project light rays on the articles as they pass the opening on the sides opposite to that viewed at the opening, one of said channels at the opening being curved toward the other channel and deflected out of the plane thereof to give a torsional twist to the articles as they pass the opening.

7. A machine for inspecting battery separators and other pliable plate-like articles, comprising a guide for the articles to be inspected, said guide having a supporting member for the articles and side channels to receive the adjacent edges thereof, said supporting member having its discharge end angled off between the side channels to provide an inspection opening therebetween and to free a portion of one of the side channels at said opening, the free portions of the side channel being deflected out of the plane of said member and curved toward the other side channel to give a torsional twist to the artcles as they pass said opening, means for feeding the articles past said opening, and a light source for illuminating the articles as they are twisted at the opening to reveal any defects or imperfections therein.

8. A machine for inspecting battery separators, comprising means providing an inspection opening, a light source arranged below the opening and disposed to project light rays toward the same, means for feeding the separators over the opening, and means for giving a torsional twist to the separators as they pass the opening to render the separator more pervious to the passage of the light rays through any cracks, knots, sap streaks or other imperfections therein to reveal the same.

WYETH ALLEN.